United States Patent
Kotyrba

(10) Patent No.: US 8,857,723 B2
(45) Date of Patent: Oct. 14, 2014

(54) CONNECTION CABLE FOR THE ELECTRICAL OR OPTICAL FIBER CONNECTION OF TWO SYSTEM DEVICES

(75) Inventor: Gregor Kotyrba, Mönchengladbach (DE)

(73) Assignee: KTS Kommunikationstechnik und Systeme GmbH, Monchengladbach (DE)

( * ) Notice: Subject to any disclaimer, the term of this patent is extended or adjusted under 35 U.S.C. 154(b) by 0 days.

(21) Appl. No.: 13/516,192

(22) PCT Filed: Dec. 13, 2010

(86) PCT No.: PCT/EP2010/069494
§ 371 (c)(1),
(2), (4) Date: Jun. 14, 2012

(87) PCT Pub. No.: WO2011/082971
PCT Pub. Date: Jul. 14, 2011

(65) Prior Publication Data
US 2012/0256005 A1  Oct. 11, 2012

(30) Foreign Application Priority Data

Dec. 14, 2009 (EP) .................................. 09179122

(51) Int. Cl.
| G06K 19/06 | (2006.01) |
| G06K 7/00 | (2006.01) |
| G02B 6/44 | (2006.01) |
| G06K 7/10 | (2006.01) |
| G02B 6/38 | (2006.01) |

(52) U.S. Cl.
CPC ............ *G06K 7/0008* (2013.01); *G02B 6/4469* (2013.01); *G06K 7/10178* (2013.01); *G02B 6/3895* (2013.01); *G06K 7/10336* (2013.01)

USPC .......................................................... 235/492

(58) Field of Classification Search
CPC .......... G06K 7/10316; G06K 7/10356; G06K 19/06; G08C 17/02; H01Q 1/2216; H01Q 1/2208
USPC .................... 235/492; 381/315; 343/700 MS; 340/572.7
See application file for complete search history.

(56) References Cited

U.S. PATENT DOCUMENTS

| 4,301,428 A | * | 11/1981 | Mayer .............................. 333/12 |
| 2007/0171073 A1 | * | 7/2007 | Ariyoshi et al. ............ 340/572.7 |
| 2008/0267436 A1 | * | 10/2008 | Kerselaers et al. ........... 381/315 |
| 2008/0273844 A1 | | 11/2008 | Kewitsch |
| 2009/0009405 A1 | * | 1/2009 | Rofougaran ........... 343/700 MS |
| 2010/0098425 A1 | | 4/2010 | Kewitsch |

FOREIGN PATENT DOCUMENTS

FR  2853982  10/2004

* cited by examiner

*Primary Examiner* — Thien M Le
*Assistant Examiner* — Asifa Habib
(74) *Attorney, Agent, or Firm* — Thomas M. Freiburger

(57) ABSTRACT

A connection cable is provided for connecting two system devices that each include a connection element or receiving socket, the connection cable having a coupling element or plug at each end, each coupling element of the cable including an RFID antenna. A line connection which is electrically separate from the connection cable extends between the two RFID antennas. The line connection can be housed within the same cable sheath as the connection cable. Each of the system devices includes an RFID transmitter, one being an RFID transponder and one being an RFID reader which transmits and receives. The RFID and line connection apparatus enables a simple form of monitoring correct connection of two system devices.

16 Claims, 1 Drawing Sheet

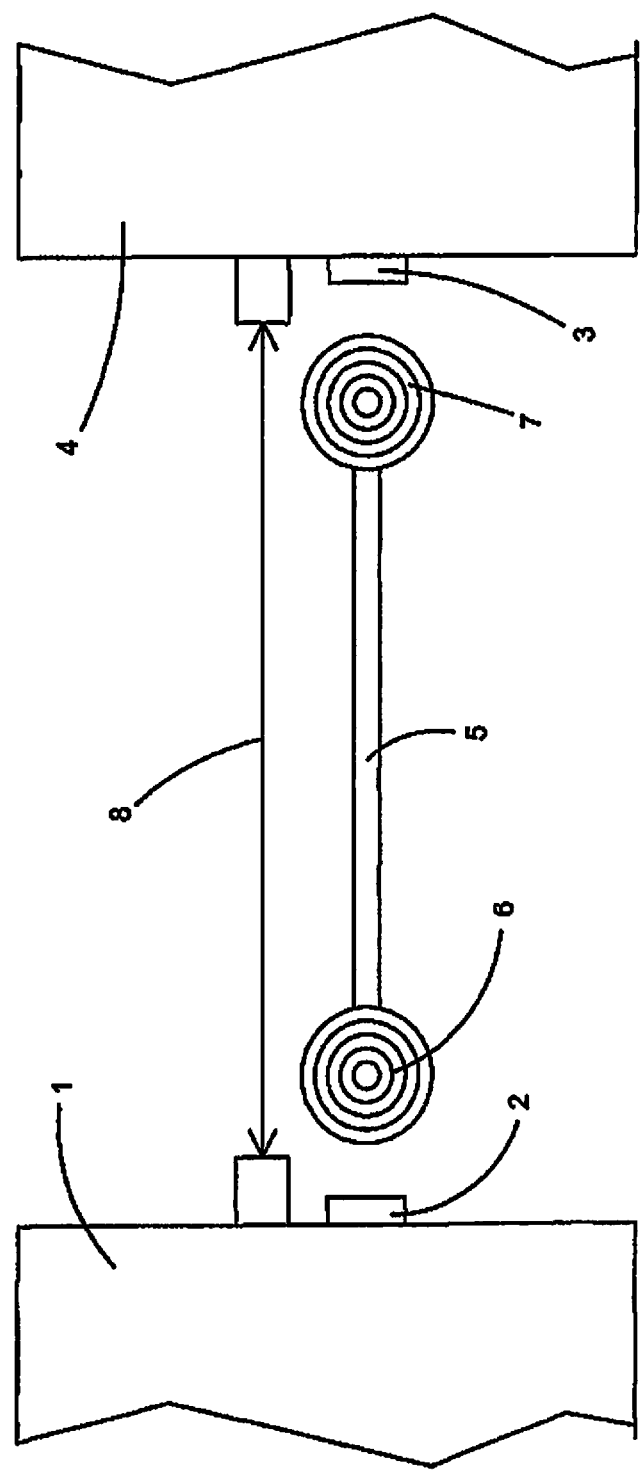

CONNECTION CABLE FOR THE ELECTRICAL OR OPTICAL FIBER CONNECTION OF TWO SYSTEM DEVICES

The invention relates to a connection cable for electrical or optical fiber connection of two system devices in accordance with the preamble to claim 1.

RFID systems for localizing and identifying objects located in the vicinity of a reader device that in particular offer significant advantages in the area of logistics have been known for about two decades.

An object to be determined is provided with a transponder, as a rule a passive transponder, that receives electromagnetic energy transmitted by a transmitter/receiver device (RFID reader or reader unit), converts this energy into operating energy, and then transmits an identification signal that can be received by the RFID reader so that the signal transmitted by the transponder can be evaluated.

The RFID transponder technology has also played a major role in cable management systems in which energy supply cables or data cables are provided with transponders on their plugs and the socket wiring is evaluated by connecting devices that have plugs with that type of cable. Therefore, RFID readers present in the connecting devices, when connected to cables that are provided with transponders in this manner, identify these cables and process the signals obtained in a suitable manner.

Such a cable management system is known for instance from DE 102 44 304 B3. In this system, both plugs for a patch cable are equipped with a transponder. Each connector in a patch field is equipped with a reader coil of a reader, the reader being connected to an evaluation unit. The transponders each include an individual identity code, so that each plug connector can be identified by means of the readers. For such a system to function it is necessary for all of the patch cables used to include different transponders or differently programmable transponders. The use of standardized cables without individual identification codes, however, does not enable intentional correlation between individual sockets of a first distributor unit and other sockets of a second distributor unit.

Known from EP 1 837 798 A2 is a device on a printer, in which device electrical energy can be transmitted between an RFID transponder and an RFID reader by means of antenna arrangements that are spaced apart but are electrically connected in order to make it possible to read-out a transponder remotely.

The underlying object of the invention is to provide a connection cable for connecting two system devices that are each provided with a connection element, which cable permits a secure allocation of one system device, to which one end of the connection cable is connected, to another system device that is connected to the second end of the connection cable, without the connection cable itself requiring individualization.

The aforesaid object is attained by the invention provided in claim 1. Advantageous refinements of the invention are provided in the subordinate claims.

The invention relates to a connection cable for the electrical or optical fiber connection of two system devices, each provided with one connection element, for transmitting electrical energy or data signals, the first end of the connection cable and the second end of the connection cable each being provided with a coupling element for connecting to a connection element of a system device.

In accordance with the invention, the coupling elements are each equipped with an antenna arrangement for RFID coupling with an RFID reader device or RFID transponder provided in a system device, the antenna arrangements being electrically connected to one another via the line connection.

A connection cable equipped in this manner therefore has at its ends only antenna arrangements that are electrically connected to one another via a line connection. No further identifications are provided, so that such a connection cable does not itself require any individualization. The antenna arrangements are preferably coupled to one another using an electrical line connection that runs parallel to the connection cable. The line connection may be attached to the outside of the connection cable or may even be integrated into the connection cable.

The antenna arrangements are preferably integrated directly into the coupling elements of the connection cable.

When such a connection cable is therefore used in a communication system, it is possible to monitor in a simple manner a correct connection of two system devices to be connected to one another.

The subject-matter of the invention is especially advantageous in those usage scenarios in which a high number of cable connections are present in a very tight space and each makes it possible to allocate devices that are to be connected to one another and at the same time to identify them.

The invention uses an RFID transponder system in which an RFID reader unit is arranged at a first location and a transponder is allocated to an object located at a second location. The first antenna arrangement is brought into the vicinity of the reader unit and the second antenna arrangement is brought into the vicinity of the transponder. The first antenna arrangement and the second antenna arrangement are passively electrically connected to one another. No energy supply for the transmission unit formed by the antenna arrangements and the line connection connecting them is necessary, so that a cable containing this unit is completely passive.

One essential thought of the invention is that RFID technology may be used for the near-field transmission despite a potential greater distance between reader unit and transponder. The reasons for this are that the first antenna arrangement is brought into the immediate vicinity of the reader unit and the second antenna arrangement is brought into the immediate vicinity of the transponder that is attached to a distanced object. Therefore only one near-field transmission of high-frequency energy takes place between each antenna and the reader unit or the transponder, and it may also be considered an inductive transmission. The antenna arrangements and their line connection to one another are without identification and they merely transmit energy and identification signals from the reader unit to the transponder and vice versa.

The reader unit is especially embodied as a transmitter/receiver unit, so that it is possible to use passive transponders that obtain their operating energy from the signal emitted by the transmitter/receiver unit and then can emit a response signal that is received and further processed by the reader/receiver unit.

The antenna arrangements are especially embodied as air coils, but they may also be ferrite-embedded coils or may include coils wound about ferrite cores.

In an alternative embodiment the antenna arrangements may also be formed from solid conductor structures or conductor structures printed on flexible printed circuit boards.

For frequency-selective signal and energy transmission, the antenna arrangements used may be oscillating circuits tuned to the RFID frequencies being used. To this end the coils used in the antenna arrangements may be combined with additional passive components, e.g. capacitors. For optimizing the energy and/or signal transmission, the antenna arrangements may also include matching networks of concentrated and/or printed components.

The connection between the antenna arrangements preferably occurs via shielded or unshielded two-wire lines that may contain parallel or twisted wires, or that may also be embodied as a coaxial line.

If the reader unit is arranged e.g. in a first patch panel and a transponder is attached to a second patch panel and the patch cable between the two patch panels is embodied in accordance with the invention, the reader device can identify and localize the transponder in a simple manner. Since between the antenna arrangements and the reader device or transponder only one near-field transmission occurs that occurs in the centimeter range or even less, in this manner it is possible to select a high number of localizable or identifiable transponders in a small working field such as a server space.

The invention shall be described in greater detail in the following using an exemplary embodiment. The only FIGURE provides a schematic view of the invention.

The FIGURE depicts a first system device 1 that includes an RFID transmitter and receiver device 2. The first system device may be a first patch panel, for instance.

A second system device 4 includes an RFID transponder 3, wherein the second system device may be a second patch panel or any desired other device that is provided with an RFID transponder 3. The system devices 1 and 4 are connected to one another via a connection cable 8, for instance a patch cable.

Although it would be possible to determine the location and identity of a transponder if there were sufficiently little distance between the RFID transmitter/receiver device 2 and the RFID transponder 3, when a plurality of second system devices 4 disposed near one another are present it is not possible to localize the transponders. First and second system devices shall be understood to be not only device units but also the sockets of such devices. In a patch panel with 16 or 32 individual sockets that are arranged in a very tight space, it is conceivable that in accordance with the prior art it is not possible to localize the individual sockets of a patch panel unless patch cables are used that each have a discrete identification.

In accordance with the invention, however, it is also possible to use connection cables that do not include a discrete identification. To this end, an inventive connection cable 8 has an antenna arrangement at each of its ends, and in the FIGURE these antenna arrangements are depicted for instance as a first antenna arrangement 6 on the first end of the connection cable 8 and as a second antenna arrangement 7 on a second end of the connection cable 8. The two antenna arrangements 6 and 7 can be electrically connected to one another via the line connection 5.

Functioning is as follows:

The RFID transmitter/receiver unit 2 induces a transmitted radio signal into the first antenna arrangement 6, which passes the received signal on via the line connection 5 to the second antenna arrangement 7 at the other end of the connection cable 8. The radio signal transmitted by the second antenna arrangement 7 is received by the RFID transponder located in the immediate vicinity. The response signal from the transponder 3 is transmitted back to the transmitter/receiver device 2 via the second antenna arrangement 7, the line connection 5, and the first antenna arrangement 6.

The connection cable may be any desired type of cable, for instance electrical data lines, telecommunications lines, power supply cables, or even optical fiber cables.

In a refined embodiment of the invention it can be provided that an amplifier circuit that is operated with an external energy source is integrated in the line connection between the antenna arrangements in order to amplify the signals transmitted between the antenna arrangements, especially the signals sent back by the transponder, when the line segments are long.

REFERENCE NUMBERS

1 First system device
2 RFID transmitter/receiver device
3 RFID transponder
4 Second system device
5 Line connection
6 First antenna arrangement
7 Second antenna arrangement
8 Connection cable

The invention claimed is:

1. In a connection cable for the electrical or optical fiber connection of two system devices (1, 4), each provided with one connection element, for transmitting electrical energy or data signals, the first end of the connection cable (8) and the second end of the connection cable (8) each being provided with a coupling element for connecting to a connection element of a system device, the connection cable (8) being a power supply cable or a data transmission cable and the electrical energy or data signals being transmitted between the system devices via the connection elements, the coupling elements and the connection cable, the improvement comprising:
the first coupling element being equipped with a first antenna arrangement (6) for RFID coupling with an RFID reader device (2) present in a system device,
the second coupling element being equipped with a second antenna arrangement (7) for RFID coupling with a transponder (3) provided in a system device,
the antenna arrangements (6, 7) being electrically connected to one another via an electrical two-wire line connection (5) extending parallel to the connection cable, the electrical two-wire line connection not being connected electrically to the connection cable,
at least one of the first and second antenna arrangements including ferrite-embedded coils or coils wound about ferrite cores, and
the antenna arrangements (6, 7) being integrated in the coupling elements of the connection cable (8).

2. The connection cable in accordance with claim 1, characterized in that the RFID reader device (2) is embodied as a transmitter/receiver unit and the transponder (3) transmits a response signal for receipt at the transmitter/receiver unit (2) in response to a signal received from the transmitter/receiver unit (2).

3. The connection cable in accordance with claim 2, characterized in that at least one of the first and second antenna arrangements (6, 7) forms oscillating circuits tuned to the RFID frequencies used and form matching networks.

4. The connection cable in accordance with claim 2, characterized in that at least one of the first and second antenna arrangements includes air coils.

5. The connection cable in accordance with claim 4, characterized in that the coils of at least one of the first and second antenna arrangements (6, 7) are formed as conductor structures printed on a solid or flexible printed circuit board.

6. The connection cable in accordance with claim 2, characterized in that the coils of at least one of the first and second antenna arrangements (6, 7) are formed as conductor structures printed on a solid or flexible printed circuit board.

7. The connection cable in accordance with claim 1, characterized in that at least one of the first and second antenna arrangements (6, 7) includes air coils.

8. The connection cable in accordance with claim 7, characterized in that at least one of the first and second antenna arrangements (6, 7) forms oscillating circuits tuned to the RFID frequencies used and form matching networks.

9. The connection cable in accordance with claim 1, characterized in that the coils of at least one of the first and second antenna arrangements (6, 7) are formed as conductor structures printed on a solid or flexible printed circuit board.

10. The connection cable in accordance with claim 9, characterized in that at least one of the first and second antenna arrangements (6, 7) forms oscillating circuits tuned to the RFID frequencies used and form matching networks.

11. The connection cable in accordance with claim 1, characterized in that at least one of the first and second antenna arrangements (6, 7) forms oscillating circuits tuned to the RFID frequencies used and form matching networks.

12. The connection cable in accordance with claim 11, characterized in that the coils form a part of the tuned oscillating circuit.

13. The connection cable in accordance with claim 1, characterized in that the first and second antenna arrangements (6, 7) are connected to one another by a shielded or unshielded line having parallel or twisted wires or by a coaxial line.

14. The connection cable in accordance with claim 1, characterized in that the line connection (5) is attached to the outside of the connection cable (8).

15. The connection cable in accordance with claim 14, characterized in that an amplifier circuit that is operated by an external energy source is integrated in the line connection between the antenna arrangements in order to amplify the signals transmitted between the antenna arrangements.

16. The connection cable in accordance with claim 1, characterized in that an amplifier circuit that is operated by an external energy source is integrated in the line connection between the antenna arrangements in order to amplify the signals transmitted between the antenna arrangements.

* * * * *